United States Patent [19]

Chern et al.

[11] Patent Number: 4,610,499
[45] Date of Patent: Sep. 9, 1986

[54] DIFFRACTION DIFFUSION SCREEN WITH HOLOGRAPHICALLY SUPPRESSED ZERO-ORDER BEAM

[75] Inventors: Mao-Jin Chern, Rancho Palos Vendes; Ronald T. Smith, Redondo Beach, both of Calif.

[73] Assignee: The United States of America as represented by the Secretary of the Air Force, Washington, D.C.

[21] Appl. No.: 667,194

[22] Filed: Nov. 1, 1984

[51] Int. Cl.⁴ .............................................. G02B 5/32
[52] U.S. Cl. .................................... 350/3.7; 350/3.77
[58] Field of Search .................... 350/162.11, 3.7, 3.77

[56] References Cited

U.S. PATENT DOCUMENTS

| | | | |
|---|---|---|---|
| 3,544,711 | 12/1970 | De Bitetto | 350/3.62 |
| 3,580,655 | 5/1971 | Leith | 350/3.6 |
| 3,708,217 | 1/1973 | McMahon | 350/3.7 |
| 3,907,403 | 9/1975 | Maeda | 350/96.27 |
| 3,980,389 | 9/1976 | Huignard et al. | 350/3.71 |
| 4,104,489 | 8/1978 | Satoh et al. | 350/3.6 |
| 4,215,924 | 8/1980 | Matsumoto | 350/96.19 |
| 4,372,639 | 2/1983 | Johnson | 350/3.7 |

FOREIGN PATENT DOCUMENTS 1574351  9/1980  United Kingdom .
1579214  11/1980  United Kingdom .

OTHER PUBLICATIONS

Sincerbox & Tan, IBM Technical Disclosure Bulletin, vol. 23, pp. 831–832, "System to Increase the Efficiency of the Holographic Energy Distribution for Individual Chip Replacement"—Jul. 1980.
RCA Review, vol. 33, Mar. 1972, pp. 125–127, "Properties of Diffuse-Object Holograms", and Holographic Optical Elements and Applications.

*Primary Examiner*—Bruce Y. Arnold
*Assistant Examiner*—B. S. Shapiro
*Attorney, Agent, or Firm*—Donald J. Singer; John R. Flanagan; Bobby D. Scearce

[57] ABSTRACT

A diffusing screen (50, 50', 50", 102) of a transmission hologram (54, 80, 94, 112) located adjacent to a diffraction optics directional diffusing screen (52, 86, 92, 114) supresses zero-order light from the diffusing screen thereby providing a device having the advantages of a directional diffusing screen but which does not have the disadvantages associated with zero-order light.

7 Claims, 5 Drawing Figures

DIFFRACTION DIFFUSION SCREEN WITH HOLOGRAPHICALLY SUPPRESSED ZERO-ORDER BEAM

RIGHTS OF THE GOVERNMENT

The invention described herein may be manufactured and used by or for the Government of the United States for all governmental purposes without the payment of any royalty.

BACKGROUND OF THE INVENTION

The present invention relates, in general, to deflecting radiated energy, and more particularly, to supressing a portion of deflected radiated energy.

In many applications of image production, light from an image source is diffused and diffracted off line to a viewing area. This image-light directional change is often effected using a diffraction optics directional diffusing screen such as disclosed in U.S. Pat. No. 4,372,639 which diffuses and directs most of the light impinging thereon into a well-defined exit pupil. However, some of the light incident on the screen passes through that screen in an undiffracted manner. This undiffracted light is known as zero-order light and presents many problems.

For example, any zero-order light in the direction of the viewer's exit pupil causes an intense "hot spot" to be observed on the screen, which is visually blinding and reduces viewability of the remaining screen, and is therefore totally unacceptable. Further, to prevent zero-order light from entering the exit pupil, the position of the exit pupil is restricted to areas outside the volume bathed in zero-order light from the image source. The result is either an off-axis exit pupil, which may be undesirable to the viewer, or an off-axis projection onto the screen, which causes problems with image distortion and uneven illumination of the screen. Zero-order light outside of the exit pupil is undesirable because it contributes to the ambient lighting in a closed environment, such as a cockpit, and thus may indirectly degrade the viewability of the screen, and zero-order light from an intense light source, such as a mercury arc lamp, may cause temporary flashblindness or even permanent eye damage to the viewer inadvertently looking into it.

Therefore, while directional diffusing screens have many advantageous properties, the zero-order light associated with such screens produces many problems. It would therefore be very desirable to be able to remove zero-order light from any viewing area associated with such screens.

It is known to separate zero-order light from incident light, see, for example, U.S. Pat. No. 3,544,711, and devices such as disclosed in U.S. Pat. No. 3,980,389 use diffraction gratings to deflect a beam of incident light. However, these devices are not disclosed in a manner suggesting any use with directional diffusing screens.

Mechanical devices have been used to perform an operation on a zero-order beam. Thus, a zero-order beam is focused through an aperture in the device disclosed in U.S. Pat. No. 4,104,489.

However, the zero-order beam in U.S. Pat. No. 4,104,489 is not removed, but is focused onto a recording disc to be used in forming an interference pattern and thus this device is not suggestive of the above-discussed problems incident directional diffusing screen. Mechanical means which include grids and vanes are disclosed in U.S. Pat. No. 3,580,655 for the purpose of blocking off rays from a zero-order image.

However, mechanical means, such as those disclosed in U.S. Pat. No. 3,580,655 have low transmission capabilities whereby part of the light will be blocked thereby reducing display image intensity. Furthermore, such mechanical means have small viewing angles and thus tend to block out divergent rays, or rays at angles beyond the designed viewing angle. In fact, such mechanical means may operate on the light rays differently depending on the angle of incidence between those rays and the means. Thus, a viewed image may have different perceived brightness and resolution for different portions of the viewing area.

These mechanical means have a significant effect on any light passing through them. Therefore, if the light which is desirably focused on a viewing area passes through such mechanical means, such desirable light will also be affected by the means meant to operate only on the zero-order light. The directional nature of such mechanical means therefore may make perceived brightness and resolution dependent on the viewer's position with respect to the viewing area. This may make it difficult for a viewer to observe all parts of the viewing area and reliably extract information regardless of his position or orientation with respect to that viewing area.

The directional nature of the mechanical means, such as disclosed in the aforementioned U.S. Pat. No. 4,104,489, may make such devices fully effective at only a single angle, or within only a very limited range of angles with light at angles different from this effective range passing through unaffected by the device. Therefore, multiple angle operation may be impossible, and a transition from design effectiveness to total uneffectiveness being gradual. Such gradual transition may degrade the reliability of a device using such mechanical means.

Therefore, the prior art does not provide any device which is capable of providing advantages of a directional diffusing screen but which does not have the disadvantages inherent in zero-order light.

SUMMARY OF THE INVENTION

It is a main object of the present invention to provide a viewing screen which possesses all the advantageous properties of a regular directional diffusing screen, but which also supresses most of the unwanted remaining zero-order light.

It is another object of the present invention to associate a means for removing zero-order light with a directional diffusing screen which will not significantly affect the intensity of that radiation from the diffusing screen passing through the means and being used in a viewing area.

It is another object of the present invention to provide a means for removing zero-order light from the light directed to a viewing area by a directional diffusing screen and which is not functionally dependent on the direction of that zero-order light.

It is another object of the present invention to associate a means for removing zero-order light from a directional diffusing screen by turning such zero-order light away from a viewing area while permitting any other light to pass therethrough in an essentially undisturbed manner.

These and other objects are accomplished by the device which includes a transmission hologram laminated to a diffraction optics directional diffusing screen. The hologram is fabricated to diffract only the zero-order light and to pass image light diffused by the screen in an unobstructed manner into the observer's exit pupil. Variations of this device can include locating the hologram between the image light source and the diffusing screen, fabricating the hologram to produce total absorption of the zero-order light, and locating the image light source and the viewing area on an axis perpendicular to the screen-hologram combination.

DETAILED DESCRIPTION OF THE PREFERRED EMBODIMENT

Figure 1:
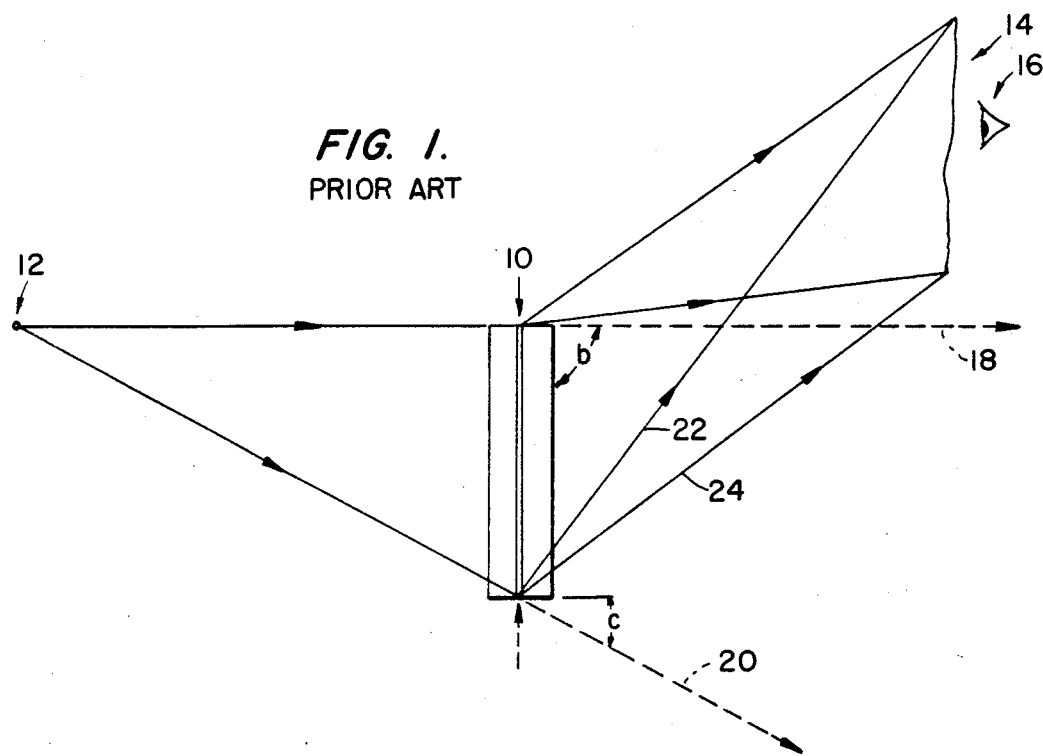
FIG. 1 is a schematic representation of a prior art directional diffusing screen.

Shown in FIG. 1 is a directional diffusing screen 10 such as disclosed in U.S. Pat. No. 4,372,639 for directing light from a monochromatic image source 12 to a viewing area 14 which is scanned by observer 16. Most of the light from source 12 is diffused by the screen 10 into an exit pupil. However, a portion of the image light passes through undiffracted by the screen. This undiffracted light is known as zero-order light, and is represented by the phantom lines 18 and 20. Such zero-order light produces the above-discussed problems thereby degrading the performance of the diffusing screen 10. The zero-order light will always be present with the diffusing screen 10, and forms an area extending from nearly perpendicular to the screen 10, as indicated by angle b between line 18 and the screen, to an acute angle, as indicated by angle c between line 20 and the screen. As is also apparent from FIG. 1, some of the viewed image is located in the area defined by lines 18 and 20. This viewed image is represented by solid lines 22 and 24.

Such a configuration thus produces the above-discussed problems for mechanical devices such as disclosed in U.S. Pat. No. 3,580,655. The zero-order light must be removed without significantly affecting the observed light, and that zero-order light may be incident on the mechanical screen at a variety of angles.

Figure 2:
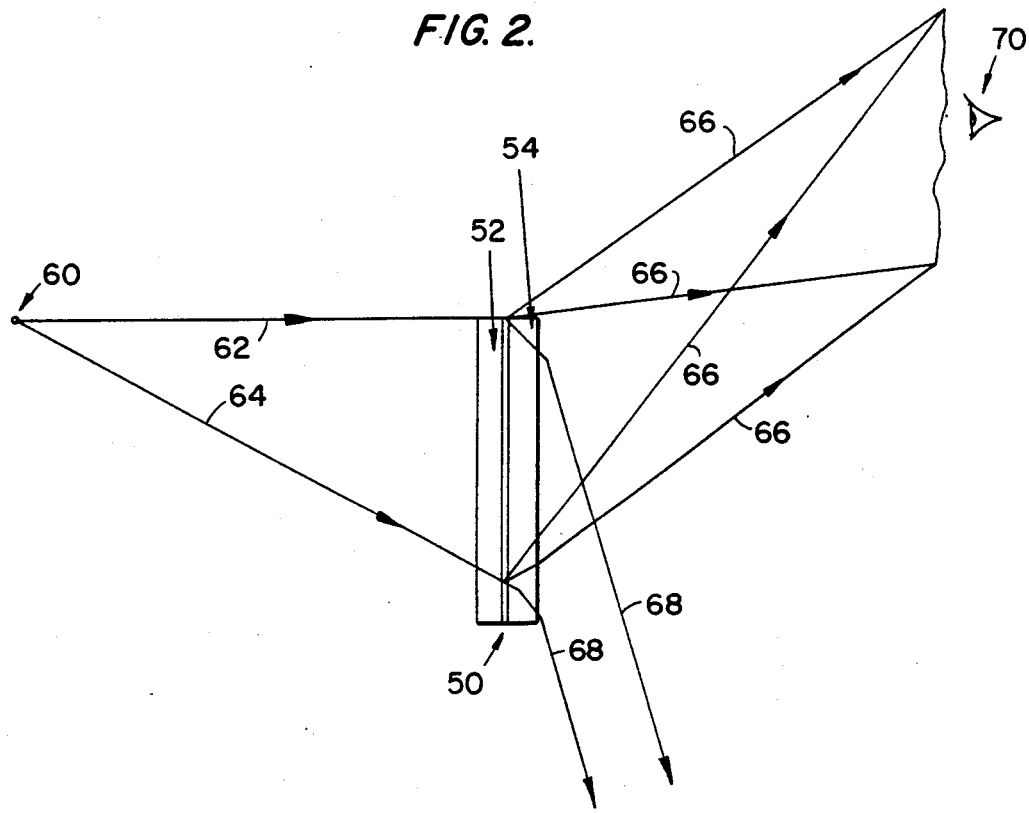
FIG. 2 is a schematic representation of an apparatus embodying the present invention.

A zero-order supressed directional diffusing screen 50 embodying the present invention is shown in FIG. 2. The screen 50 includes a diffraction optics diffusing screen 52, similar to the screen disclosed in U.S. Pat. No. 4,372,639, the disclosure of which is incorporated by reference associated with an optical means, such as a transmission hologram 54 located to intercept zero-order light passing through the diffusing screen 52 and designed to diffract that zero-order light away from the viewing area while passing most of the image light diffused by the screen 52 incident thereon without significantly affecting such image light. Thus, most of the light from an image light source 60, as represented by rays 62 and 64 impinging on the diffraction optics diffusing screen 52 is diffused and directed into a well-defined exit pupil, or viewing area, as represented by lines 66. The undiffracted portion of the image light passing through screen 52, i.e., the zero-order light, is represented by lines 68 and it, like the diffracted light, encounters the transmission hologram 54. The hologram 54 diffracts most of this zero-order light away from the observer as represented at 70.

The transmission hologram 54 is fabricated to diffract only the zero-order light, and the image light, represented by lines 66, which is diffused by the screen 52 passes unobstructedly through the hologram 54 toward the exit pupil. In this manner, the angle of incidence of the zero-order light on the hologram 54 does not inhibit the zero-order light filtering function of that hologram 54, nor does the filtering of zero-order light by the hologram 54 significantly affect the image light diffracted toward the observer. The image light diffracted into the viewing area will be uniformly sharp and the sharpness and intensity of the image observed by the observer will not be a function of the angle of observation or observer position in the viewing area. Preferably, the screen 52 is laminated to the hologram 54.

By using a screen similar to the screen disclosed in U.S. Pat. No. 4,372,639, the brightness of the image in a particular portion of the viewing area will be essentially unaffected by a viewer's position. Hence, the viewer will be able to observe all parts of the viewing area and reliably extract information therefrom. However, by associating the hologram with this screen, the undesirable zero-order light from such a screen is suppressed whereby the advantageous properties of the viewing screen are obtained without the detrimental properties inherent in zero-order light. Furthermore, the screen can be designed to illuminate the viewing area with a selected intensity distribution so that information in the viewing area has a substantially uniform illumination across the viewing area.

Figure 3:
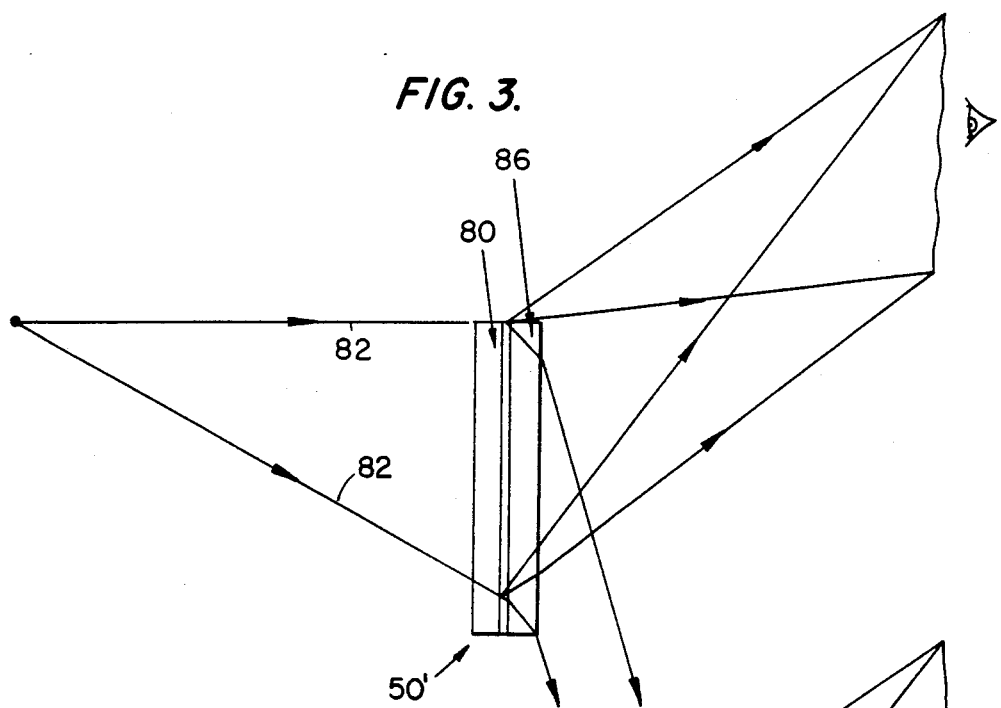
FIG. 3 is an alternative embodiment of the apparatus of the present invention.
Figure 4:
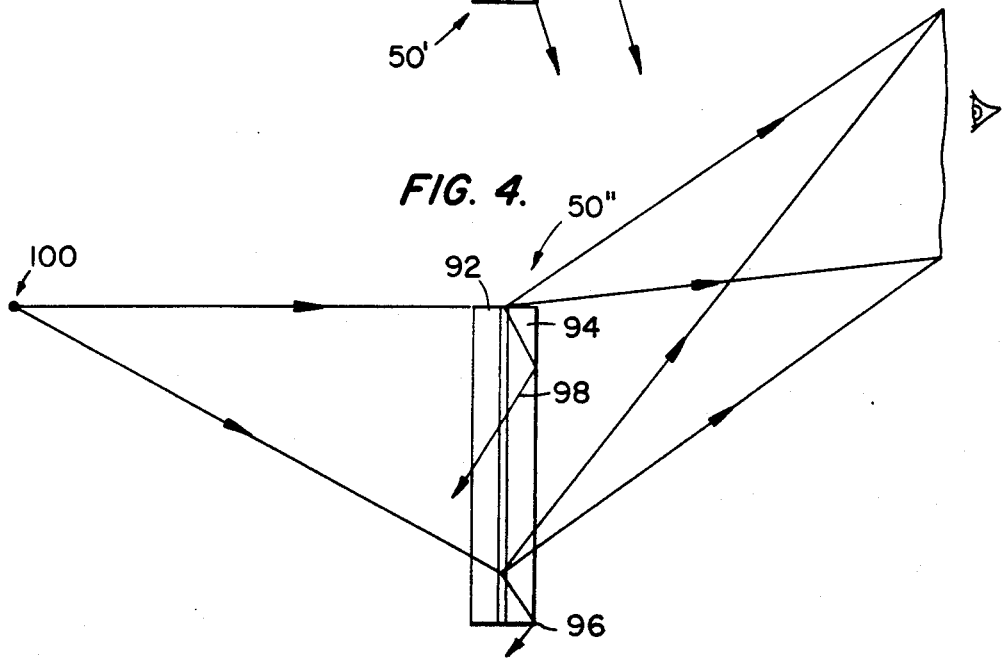
FIG. 4 is another alternative embodiment of the present invention.
Figure 5:
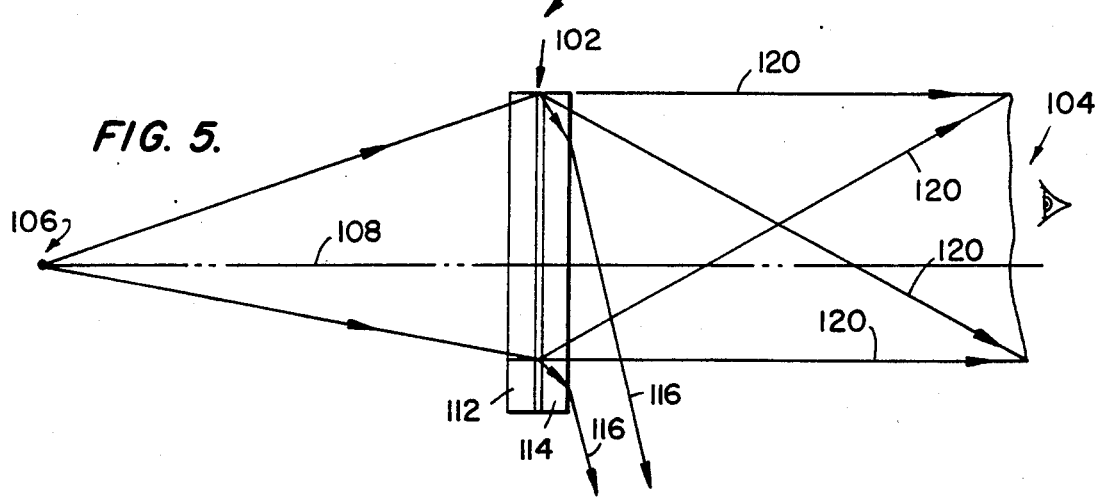
FIG. 5 is another embodiment of the apparatus of the present invention.

Variations of the zero-order suppressed diffusing screen of the present invention are shown in FIGS. 3 through 5. The screen 50' shown in FIG. 3 includes a transmission hologram 80 diffracting image light 82 into an off-axis direction, and a diffraction optics diffusing screen 86 redirects most of this light into a well-defined exit pupil.

A screen 50'' is shown in FIG. 4 as including a diffraction optics diffusing screen 92 in conjunction with a transmission hologram 94 which is designed to diffract zero-order light at such a large angle that it totally reflects off hologram-air interface 96 back through the screen, as indicated at 98, where it may be absorbed, or reflected at an angle which directs such light back toward image light source 100.

In any of the above-disclosed screens, additional holograms can be added to ensure suppression of all zero-order light. Since transmission holograms can be designed to diffract nearly one-hundred percent of the light, a screen 102 as a shown in FIG. 5 can be used in conjunction with an exit pupil 104 and an image light source 106 which both lie along axis 108 of the screen 102. The screen 102 includes a transmission hologram 112 and a diffraction optics diffusing screen 114 for diffracting zero-order light 116 away from viewing area 104 and diffracting desired light 120 to that viewing area.

We claim:

1. A zero-order suppressed directional diffusing screen for directing light from an image light source to an observation area comprising:

a diffraction optics directional diffusing screen for diffracting image light from the image light source to the observation area; and a transmission hologram disposed adjacent said diffraction optics directional screen and configured to diffract only the zero-order portion of said image light transmitted by said diffraction optics directional diffusing screen away from the observation area.

2. The directional diffusing screen defined in claim 1 wherein said transmission hologram is located between said diffraction optics directional diffusing screen and the observation area.

3. The directional diffusing screen defined in claim 1 wherein said diffraction optics directional diffusing screen is located between said transmission hologram and the observation area.

4. The directional diffusing screen defined in claim 2 wherein said transmission hologram is disposed in air, and further comprising a hologram-air interface configured to diffract said zero-order portion of said image light at an angle large enough to totally reflect said zero-order portion of said image light off of said hologram-air interface.

5. The directional diffusing screen defined in claim 3 wherein said diffraction optics diffusing screen includes a central axis extending essentially perpendicular to the image light source and the observation area is located along said central axis.

6. Apparatus for deflecting a beam of incident radiation comprising:

a diffraction optics diffusing screen positioned to diffract a portion of the beam of incident radiation and to pass the rest of the radiation therethrough in an undiffracted manner as zero-order light; and a transmission hologram laminated to said diffraction optics diffusing screen to intercept said zero-order light and some of said portion of the beam, said hologram configured to diffract only said zero-order light and to pass all other light intercepted.

7. An optical system comprising:

a source of image light;

an observation area;

diffraction means for diffracting a predetermined substantial portion of the image light from said source of image light to said observation area whereby said predetermined substantial portion of the image light is redirected and diffused into a predetermined directional range to said observation area with preselected intensity distribution and substantially uniform illumination across said observation area; and a transmission hologram disposed between said diffraction means and said observation area, said transmission hologram configured to diffract only zero-order light transmitted by said diffraction means.

* * * * *